United States Patent
Netzker et al.

[11] Patent Number: 6,003,399
[45] Date of Patent: Dec. 21, 1999

[54] MOUNT FOR A COVER

[75] Inventors: Ralph-Maria Netzker, Ludwigsburg; Peter Höbel, Neuhausen; Helmut Gocht, Mönsheim; Andreas Gutschner, Markgröningen, all of Germany

[73] Assignee: Dr. Ing. H.C.F. Porsche AG, Germany

[21] Appl. No.: 08/908,719

[22] Filed: Aug. 8, 1997

[30] Foreign Application Priority Data

Aug. 8, 1996 [DE] Germany .................. 196 31 941

[51] Int. Cl.⁶ .................................. B60K 20/00
[52] U.S. Cl. ............ 74/473.36; 411/57; 411/182; 206/1.5; 74/606 R
[58] Field of Search ............ 74/473.3, 473.36, 74/606 R; 411/383, 182, 33, 15, 508, 509, 55, 339, 338, 57; 403/11, 409.1; 220/327, 328; 206/1.5

[56] References Cited

U.S. PATENT DOCUMENTS

| | | | |
|---|---|---|---|
| 5,494,158 | 2/1996 | Erickson | 206/1.5 |
| 5,584,207 | 12/1996 | Paul et al. | 74/606 R |
| 5,586,364 | 12/1996 | Ferrari et al. | 411/57 |
| 5,598,746 | 2/1997 | Chen | 74/606 R |
| 5,636,535 | 6/1997 | Shimada | 206/1.5 |
| 5,746,559 | 5/1998 | Shirai | 411/182 |
| 5,778,411 | 7/1998 | Vasseur et al. | 411/55 |

FOREIGN PATENT DOCUMENTS 9102932  9/1991  Germany .

*Primary Examiner*—Tamara L. Graysay
*Assistant Examiner*—Marcus Charles
*Attorney, Agent, or Firm*—Evenson, McKeown, Edwards & Lenahan, P.L.L.C.

[57] ABSTRACT

A cover and housing having a mounting arrangement, especially for a selector lever housing. According to the invention, the cover is fastened by means of two bearing points to provide a method of fastening a cover that can be mounted simply without adjustment and provides an exact fit for the cover. The first bearing point is made cylindrical and the axis of this cylinder runs parallel to a mounting direction or placement direction of the cover. The second bearing point is made wedge-shaped and the wedge axis lies in a plane that is perpendicular to the mounting direction or placement direction and is aligned so that it is not parallel to a tangent at the first cylindrical bearing point.

17 Claims, 2 Drawing Sheets

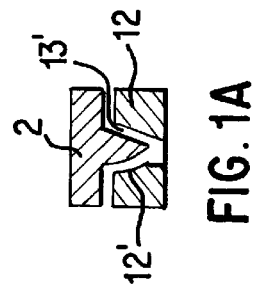
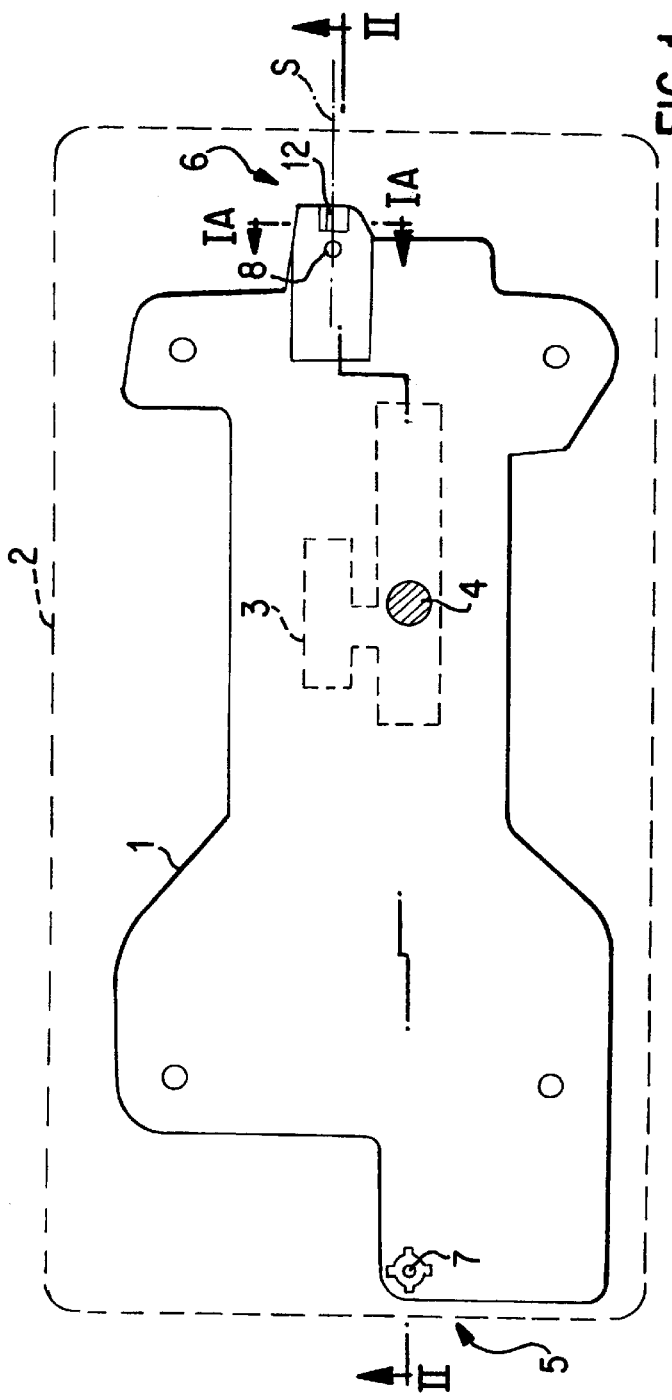
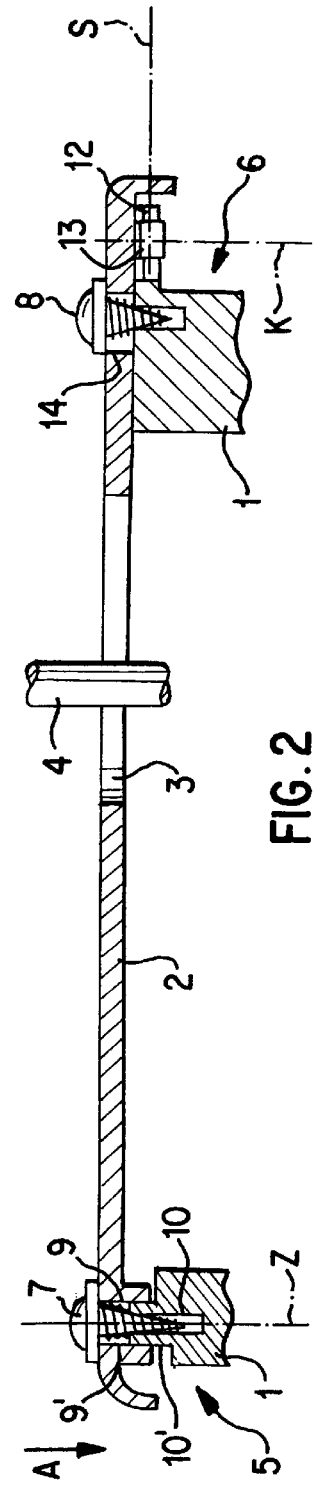

MOUNT FOR A COVER

BACKGROUND AND SUMMARY OF THE INVENTION

This application claims the priority of German application 196 31 941.2 filed in Germany on Aug. 8, 1996, the disclosure of which is expressly incorporated by reference herein.

The invention relates to a mount for a cover in a housing, especially a selector lever housing.

Covers always are subject to the problem of mounting them so that they fit exactly on a housing. Especially in housings for selector levers, but also in other housings in which operating elements project through the cover, the additional problem arises that the selector lever or operating element is intended to move in the openings in the cover provided for the purpose with tolerances that are as close as possible.

A goal of the invention is to provide a mount for a cover that can be mounted simply without adjustment and fits exactly.

This goal is achieved according to the invention by providing an arrangement comprising a first bearing point formed by respective mating cylindrical surfaces on the cover and housing with a cylinder axis extending parallel to a placement installation direction of the cover on the housing, and a second bearing point formed by respective mating wedge-shaped surfaces on the cover and housing, with a wedge axis lying in a plane perpendicular to the placement direction of the cover and not parallel to a tangent at the first bearing point. Two bearing points serve as a mount for a cover. The first bearing point is made cylindrical and the axis of this cylinder extends parallel to a mounting direction or placement direction of the cover. The second bearing point is made wedge-shaped and the axis of the wedge lies in a plane perpendicular to the mounting direction and/or placement direction (in other words, parallel to the cover as a rule) and is aligned so that it is not parallel to a tangent at the first cylindrical bearing point (does not extend through the cylindrical first bearing point). According to one advantageous feature of certain preferred embodiments of the invention, fastening means such as screws and the like are used to fasten the cover in the vicinity of the two bearing points. As a result, exact positioning of the cover is further improved since the forces of the fastening means act directly on the bearing points.

It is also contemplated according to certain preferred embodiments of the invention to insert the fastening means into the axis of the cylinder, especially in the case of a cylindrical bearing point. This simplifies the manufacture of a corresponding cover since a single stepped bore in the cover provides both the receptacle for the bearing point and the through opening for the mounting means.

It has been found to be advantageous In the case of the second wedge-shaped bearing point to arrange the axis of the wedge parallel to the principal lengthwise dimension of the opening of the cover so that lengthwise tolerances in the cover can be accepted without the positioning of the selector lever or the operating element with respect to the opening being changed.

It is also contemplated in certain preferred embodiments to provide for a cover that is held at the two bearing points as described above to extend over other assemblies, for example another housing. In the case of such covers, it was previously known to position the cover centrally relative to the positions of two housings, and to secure it there. On the other hand, the proposed design makes it possible to position the cover relative to a single housing and thus ensure for example that an operating element projecting out of this housing can be guided with low tolerances though an opening provided in the cover.

Moreover, in this connection, if the cover is mounted on the other assemblies or housings by means of mounting elements that are float-mounted, assurance is also provided that no stresses can develop inside the cover, even with position tolerances between the individual assemblies or housings.

Other objects, advantages and novel features of the present invention will become apparent from the following detailed description of the invention when considered in conjunction with the accompanying drawings.

BRIEF DESCRIPTION OF THE DRAWINGS

FIG. 1 shows a top view of a selector lever housing with two bearing points in a first embodiment of the invention;

FIG. 1A is a sectional view through the cover of the selector lever housing along line I'—I' in FIG. 1;

FIG. 2 is a section through the cover of the selector lever housing along line II—II in FIG. 1.

DETAILED DESCRIPTION OF THE INVENTION

Figure 3:
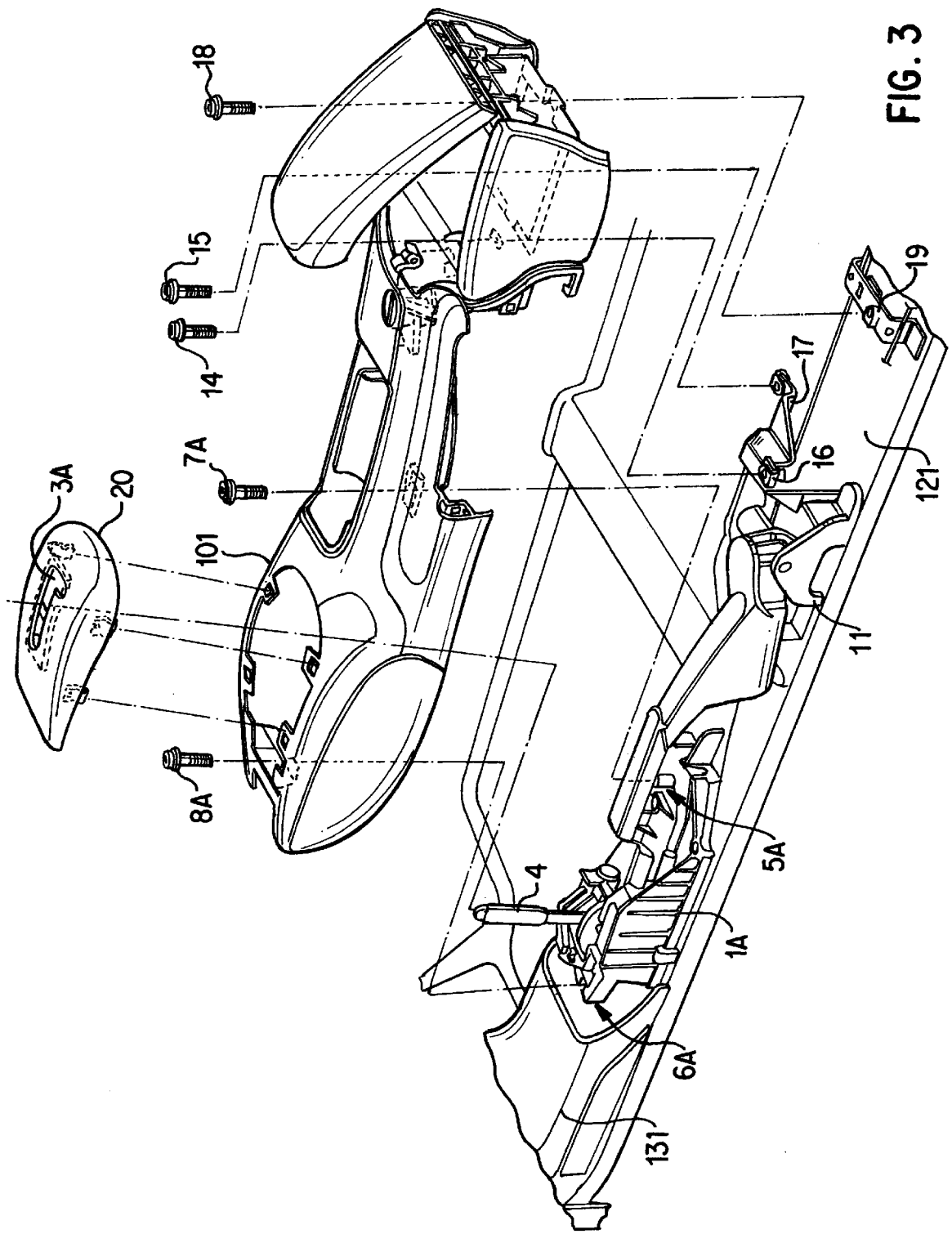
FIG. 3 shows a perspective view of a selector lever housing covered by a console in a second embodiment of the invention.

A selector lever housing 1 shown in a first embodiment is provided with a cover 2 represented by the dashed lines, with an H-shaped opening 3 being provided in said cover to allow a selector lever 4 to pass through.

Cover 2 is held on selector lever housing 1 by means of a fastening composed of a first bearing point 5 and a second bearing point 6 and held in place by fastening means, screws 7, 8 in this case.

The first bearing point 5 is made cylindrical. Cylinder axis Z extends parallel to a placement direction A of cover 2 on selector lever housing 1. A bore 9 is provided in cover 2 to accept cylindrical bearing point 5, through which bore screw 7 also passes. The mating cylindrical surfaces 9' at the cover 2 and 10' of the housing 1 form the bearing point 5. Screw 7 engages a bore 10 located concentrically inside first bearing point 5.

The second bearing point 6 consists of a wedge-shaped receptacle 12 that is open in placement direction A as well as a corresponding projection 13 in cover 2, said projection likewise being made wedge-shaped. As shown in FIGS. 4A and 4B, wedge projection 13 has a wedge plane axis K which is parallel to mounting direction A. An intersecting plane axis S of receptacle 12 lies in a plane perpendicular to placement direction A and runs close to first bearing point 5 and parallel to main lengthwise direction of opening 3, which is constituted here by the long legs of H-shaped opening 3. In the example shown, wedge-shaped receptacle 12 is open at the bottom; however, this is not absolutely necessary but it is merely important to ensure that projection 13 abuts the lateral surfaces 12' of receptacle 12 with its bearing 13' and does not rest on any bottom area of receptacle 12 that may be present. Since receptacle 12 does not have any such bottom area, the second screw 8 is located next to receptacle 12 and therefore next to projection 13 as well. Projection 13 is movable within receptacle 12 along intersecting plane axis S so that an elongate hole 14 is provided inside cover 2 for screw 8, said hole being so dimensioned that it can compensate for the length tolerances of cover 2 relative to the position of screw 8.

The first cylindrical bearing point ensures that cover 2 is precisely positioned at this point relative to selector lever housing 1. The angular position of cover 2 relative to selector lever housing 1 is determined by second cylindrical bearing point 6 alone since screw 7 is located concentrically with respect to first bearing point 5 and so has no effect on the angular position of the cover. Since cover 2 and selector lever housing 1 are not connected to one another before mounting screws 7 and 8 are tightened, projection 13 of cover 2 can be inserted into wedge-shaped receptacle 12 when cover 2 is placed on selector lever housing 1 and thus compensate for tolerances in the lengthwise direction of cover 2. It is especially advantageous in this regard for intersecting plane axis S to extend parallel to the primary lengthwise direction of recess 3 because in this way lengthwise tolerances in cover 2 or in selector lever housing 1 cannot have any influence on the guidance of selector lever 4 in opening 3.

In FIG. 3, corresponding reference numbers as in the embodiment of FIGS. 1–2 are used, with a suffix "A" to designate generally similar structures. FIG. 3 shows a second embodiment of the use of first bearing point 5A as well as second bearing point 6A for aligning a console 101 with a large area. Unless otherwise described below, the description of these same features with respect to FIGS. 1–2 can be referred to. For this purpose, selector lever housing 1A as well as handbrake lever housing 11 are located one behind the other on the same support 121. Selector lever housing 1 as well as handbrake lever housing 11 are positioned with respect to one another on support 121 by suitable devices such as centering pins for example. Console 101 abuts another covering part 131.

To mount console 101, the latter is placed on selector lever housing 1A and aligned thereon by means of bearing points 5A and 6A. Once in position, console 101 is secured by tightening mounting screws 7A and 8A. Console 101 is also held in place in the vicinity of handbrake lever housing 11 by two additional screws 14 and 15. Mounting screws 14 and 15 engage Tinnerman nuts 16 and 17 that are float-mounted with a small amount of play that allows them to move perpendicularly with respect to the mounting direction on handbrake lever housing 11. This play ensures that when mounting screws 14 and 15 are tightened, the position tolerances between handbrake lever housing 11 and selector lever housing 1A can be compensated and no stress develops in console 101. Finally, console 101 is held in place by a mounting screw 18 that engages a Tinnerman nut 19 held in support 12.

In the vicinity of selector lever 4A, a through opening with a large area that can be covered by a diaphragm 20 is provided in console 101. Opening 3A to allow selector lever 4A to pass through is provided in this diaphragm 20. As in the case of the first embodiment, the tolerance between the geometric dimensions of selector lever 4A and the geometric dimensions of opening 3A is made small. Because console 101 is aligned with respect to selector lever housing 1A, assurance is also provided that selector lever 4A is guided with the largest possible accuracy within opening 3A.

Since selector lever housing 1A is located immediately adjacent to another cover part 131, positioning of console 101 in the area where it abuts the other covering part 131 is also assured.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A cover and housing having a mounting arrangement, comprising:
    a first bearing point formed by respective mating cylindrical surfaces on the cover and housing with a cylinder axis extending parallel to a placement installation direction of the cover on the housing, the cover being connected by fastening members to the housing, and
    a second bearing point formed by respective mating wedge-shaped surfaces which extend in a lengthwise direction on the cover and housing, wherein a wedge plane extends parallel to the placement direction of the cover and an intersecting plane extends parallel to the wedge-shaped surfaces.

2. Mount according to claim 1, wherein the fastening members for the cover are provided on the housing in the vicinity of the bearing points.

3. Mount according to claim 1, wherein the wedge plane of the second bearing point is located parallel to the main lengthwise extent of a through opening provided in the cover.

4. Mount according to claim 2, wherein the wedge plane of the second bearing point is located parallel to the main lengthwise extent of a through opening provided in the cover.

5. Mount according claim 1, wherein the cover extends over a further assembly housing.

6. Mount according to claim 2, wherein the cover extends over a further assembly housing.

7. Mount according to claim 3, wherein the cover extends over a further assembly housing.

8. Mount according to claim 5, wherein the cover is held to the further assembly housing by means of float-mounted elements.

9. Mount according to claim 6, wherein the cover is held to the further assembly housing by means of float-mounted elements.

10. Mount according to claim 7, wherein the cover is held to the further assembly housing by means of float-mounted elements.

11. A cover and housing having a mounting arrangement for a vehicle gear selector housing with a gear selector lever protruding through an opening in said cover when in an in use position on a vehicle, comprising:

respective mating cylindrical guide surfaces at the cover and housing which together form a first bearing connection of the cover and housing when in an assembled position, said cylindrical guide surfaces having a common cylinder axis extending in a cover assembling placement direction, and respective mating wedge shaped guide surfaces at the cover and housing which together form a second bearing connection of the cover and housing when in an assembled position, said wedge shaped guide surfaces having a wedge plane extending transverse to said cylindrical axis to permit transverse adjustment movement of said cover and housing with respect to the cylindrical axis during connection of the cover with the housing.

12. A mounting arrangement according to claim 11, comprising fastening elements which in use fasten said cover and housing together as they are positioned by the first and second bearing connections.

13. A mounting arrangement according to claim 12, wherein a first of said fastening elements has an axis coaxial with the cylinder axis.

14. A mounting arrangement according to claim 13, wherein a second of said fastening elements has an axis spaced from said wedge shaped guide surfaces.

15. A mounting arrangement according to claim 14, wherein said first and second fastening elements are threaded clamping members.

16. A mounting arrangement according to claim 15, wherein the first and second fastening elements are screws.

17. Mount according claim 1, wherein the housing is a selector lever housing.

* * * * *